United States Patent
Tonucci

(10) Patent No.: US 7,683,444 B2
(45) Date of Patent: Mar. 23, 2010

(54) METAMATERIAL STRUCTURE HAS RESONANT AND STRIP LINE ELEMENTS COMPRISING A PHOTOCONDUCTIVE SEMICONDUCTOR MATERIAL FORMED ON SUBSTRATE TO INDUCE NEGATIVE PERMEABILITY AND NEGATIVE PERMITTIVITY IN OPERATING FREQUENCY RANGE

(75) Inventor: Ronald J Tonucci, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 51 days.

(21) Appl. No.: 11/559,508

(22) Filed: Nov. 14, 2006

(65) Prior Publication Data

US 2008/0296710 A1    Dec. 4, 2008

Related U.S. Application Data

(63) Continuation of application No. 11/537,848, filed on Oct. 2, 2006, now abandoned.

(60) Provisional application No. 60/727,257, filed on Sep. 30, 2005.

(51) Int. Cl.
| | |
|---|---|
| *G01J 1/00* | (2006.01) |
| *G01J 5/00* | (2006.01) |
| *G01J 5/20* | (2006.01) |
| *G01T 1/00* | (2006.01) |
| *G01T 1/24* | (2006.01) |
| *H01L 27/14* | (2006.01) |
| *H01L 31/00* | (2006.01) |
| *H01L 43/00* | (2006.01) |
| *H03K 3/45* | (2006.01) |
| *H03K 17/80* | (2006.01) |

(52) U.S. Cl. ............... 257/421; 250/336.1; 250/338.1; 250/338.4; 250/370.01; 327/510; 327/514; 257/E43.001

(58) Field of Classification Search ............... 343/757, 343/874, 876, 909; 257/421, E43.001; 250/336.1, 250/338.1, 338.4, 370.01; 327/510, 514
See application file for complete search history.

(56) References Cited

U.S. PATENT DOCUMENTS 4,405,970 A    9/1983    Swindal et al.

(Continued)

OTHER PUBLICATIONS

Ng, Kwok K. Complete Guide to Semiconductor Devices. 2nd ed. New York: John Wiley & Sons, Inc., 2002.*

(Continued)

*Primary Examiner*—Phat X Cao
*Assistant Examiner*—Diana C Garrity
(74) *Attorney, Agent, or Firm*—John J. Karasek; Sally A. Ferrett

(57) ABSTRACT

Materials and structures whose index of refraction can be tuned over a broad range of negative and positive values by applying above band-gap photons to a structure with a strip line element, a split ring resonator element, and a substrate, at least one of which is a photoconductive semiconductor material. Methods for switching between positive and negative values of n include applying above band-gap photons to different numbers of elements. In another embodiment, a structure includes a photoconductive semiconductor wafer, the wafer operable to receive above band-gap photons at an excitation frequency in an excitation pattern on a surface of the wafer, the excitation patterns generating an effective negative index of refraction. Methods for switching between positive and negative values of n include projecting different numbers of elements on the wafer. The resonant frequency of the structure is tuned by changing the size of the split ring resonator excitation patterns.

20 Claims, 15 Drawing Sheets

U.S. PATENT DOCUMENTS

| | | | |
|---|---|---|---|
| 5,808,349 | A | 9/1998 | Papadopoulos |
| 6,177,909 | B1 | 1/2001 | Reid et al. |
| 6,791,432 | B2 | 9/2004 | Smith |
| 6,859,114 | B2 | 2/2005 | Eleftheriades |
| 6,938,325 | B2 | 9/2005 | Tanielian |
| 7,015,865 | B2 | 3/2006 | Isaacs |
| 7,205,941 | B2 * | 4/2007 | Wang et al. ............ 343/700 MS |
| 2003/0223721 | A1 | 12/2003 | Povinelli et al. |
| 2004/0066251 | A1 | 4/2004 | Eleftheriades et al. |
| 2005/0031295 | A1 | 2/2005 | Engheta et al. |
| 2005/0200540 | A1 | 9/2005 | Isaacs et al. |
| 2005/0221128 | A1 | 10/2005 | Kochergin |
| 2005/0225492 | A1 | 10/2005 | Metz |
| 2005/0270091 | A1 | 12/2005 | Kozyrev et al. |
| 2006/0028385 | A1 | 2/2006 | Davis et al. |
| 2006/0125681 | A1 | 6/2006 | Smith et al. |
| 2007/0242360 | A1 | 10/2007 | Rachford |

OTHER PUBLICATIONS

Long-range Babinet's effect in complementary left-handed material with gold nanoparticles S.-C. Wu, Appl. Phys. Lett. 84, 1982 (2004), DOI:10.1063/1.1669080.*

Far-Infrared Resonance in Split Ring Resonators, A-Chuan Hsu, Yi-Kai Cheng, Kuan-Hung Chen, Jyh-Long Chern, Shich Chuan Wu, Ching-Fu Chen, Hao Chang, Yu-Hung Lien and Jow-Tsong Shy, Jpn. J. Appl. Phys. 43 (2004) L176.*

Shelby, R. A., "Experimental Verification of a Negative Index of Refraction", Science, vol. 292, Apr. 2001, p. 77-79.

Veselago, V. G., "The Electrodynamic of Substances with Simultaneously Negative Values of", Soviet Physics Uspekhi, vol. 10, No. 4, Jan.-Feb. 1968, p. 509-514.

Smith, D. R., "Composite Medium with Simultaneously Negative Value of Permeability and Permittivity", The American Physical Society, vol. 84, No. 18, May 1, 2000, p. 4184-4187.

Pendry, J. B., "Extremely Low Frequency Plasmons in Metallic Mesostructures", Physical Review Letters, vol. 76, No. 25, Jun. 1996, p. 4773-4776.

Pendry, J. B., "Magnetism from Conductors and Enhanced Nonlinear Phenomena", IEEE Transactions on Microwave Theory and Techniques, vol. 47, No. 11, Nov. 1999, p. 2075-2084.

Parazzoli, C. G., "Experimental Verification and Simulation of Negative Index of Refraction Using Snell's Law", Physical Review Letters, vol. 90, No. 10, Mar. 2003, p. 107401-1-107401-4.

Houck, A. A., "Experimental Observations of a Left-Handed Material That Obeys Snell's Law", Physical Review Letters, vol. 90, No. 13, Apr. 2003, p. 137401-1-137401-4.

Linden, S., "Magnetic Response of Metamaterials at 100 Terahertz", Science, vol. 306, Nov. 19, 2004, p. 1351-1353.

Abele, P., "Sampling Circuit on Silicon Substrate for Frequencies beyond 50 GHz", 2002 IEEE MTT-S Digest, p. 1681-1684.

Van Der Weide, D. W., "Delta-doped Schottky diode nonlinear transmission lines for 480-fs, 3.5-V transients", Appl. Phys. Lett. vol. 65, Issue 7, Aug. 1994, p. 881-883.

Horii, Y., "Scattering Characteristics of an Interdigital Gap in the Silicon Microstrip Line under Laser Spot Illumination", 1997 Asia Pacific Microwave Conference, pp. 561-564.

Liu, D., "Structurally Embedded Photoconductive Silicon Bowtie Antenna", IEEE Photonics Technology Letters, vol. 10, No. 5, May 1998, p. 716-718.

Srivastava, A., "Laser-Induced Above-Band-Gap Transparency in GaAs", Physical Review Letters, vol. 93, No. 15, Oct. 8, 2004, p. 157401-1-157401-4.

Shadrivov, I. V., "Tunable split-ring resonators for nonlinear negative-index metamaterials", Optics Express vol. 14, pp. 9344-9349, Aug. 2006.

Shadrivov, H. V., "Nonlinear left-handed metamaterials", Radio Science, vol. 40, RS3S90, doi:10.1029/2004RS003191, May 2005, p. 1-10.

Kozyrev, A. B., "Wave propagation in nonlinear left-handed transmission line media", Applied Physics Letters, vol. 87, (Sep. 19, 2005, published online by AIP on Sep. 14, 2005), p. 121109-1-121109-3.

Wiltshire, M. C. K., "Optical Materials: Bending Light the Wrong Way", Science, Apr. 6, 2001, vol. 292, No. 5514, pp. 60-61.

Hecht, J., "Photonic Frontiers: metamaterials-Matamaterials do optical wonders", [online], [retrieved on Aug. 22, 2006] retrieved from the internet <URL: http://lfw.pennet.com/articles/article-display.cfm?article-id=259931>.

"Negative confirmation", [online], [retrieved on Aug. 22, 2006], retrieved from the internet <URL:http://nature.com/physics/highlights/6929-2.html>.

Pendry, J. B., "A Chiral Route to Negative Refraction", Science, vol. 306, Nov. 19, 2004, p. 1353-1355.

Podolskiy, V. A., "Plasmon modes and negative refraction in metal nanowire composites", Optics Express, vol. 11, No. 7, p. 735-745, Apr. 2003.

Bhattacharya, U., "DC-725 GHz Sampling Circuits and Subpicosecond Nonlinear Transmission Lines Using Elevated Coplanar Waveguide", IEEE Microwave and Guided wave letters, vol. 5, No. 2, Feb. 1995, pp. 50-52.

* cited by examiner

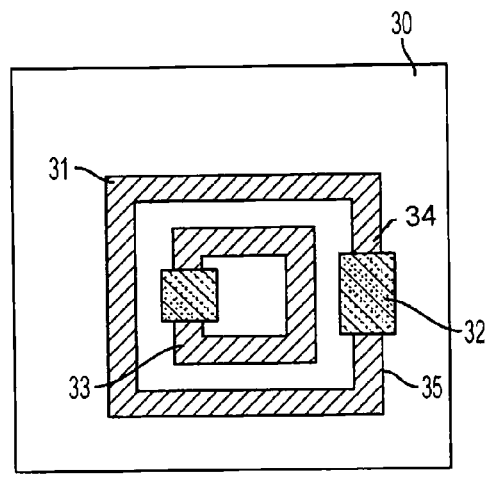
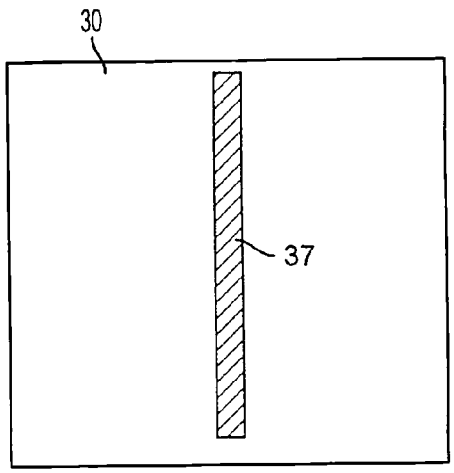
FIG. 3A          FIG. 3B
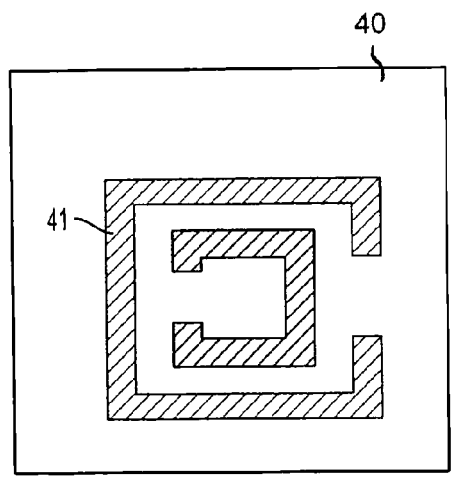
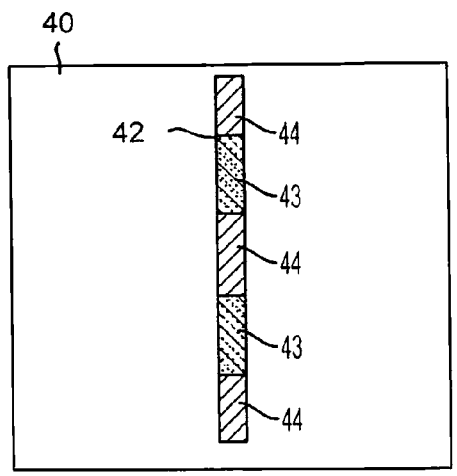
FIG. 4A          FIG. 4B E gap A > E gap B

METAMATERIAL STRUCTURE HAS RESONANT AND STRIP LINE ELEMENTS COMPRISING A PHOTOCONDUCTIVE SEMICONDUCTOR MATERIAL FORMED ON SUBSTRATE TO INDUCE NEGATIVE PERMEABILITY AND NEGATIVE PERMITTIVITY IN OPERATING FREQUENCY RANGE

CROSS-REFERENCE TO RELATED APPLICATIONS

This application is a continuation application of patent application Ser. No. 11/537,848, filed in the United States on Oct. 2, 2006, which is a nonprovisional of and claims the benefit of provisional patent application No. 60/727,257, filed in the United States on Sep. 30, 2005, each of which are incorporated by reference herein in their entireties.

BACKGROUND OF THE INVENTION

This invention relates generally to the field of negative index of refraction materials, and more particularly, to materials whose index of refraction can be tuned over a broad range of negative and positive values.

Material containing an electric permittivity and magnetic permeability that are simultaneously negative for some frequency have a negative index of refraction, and have been called left handed material (LHM) or negative index material (NIM). V. G. Veselago, in "The electrodynamics of substances with simultaneously negative values of $\in$ and $\mu$", Soviet Phys. Usp. 10, 509 (1968), described some characteristics of such a material, including a negative index of refraction and the ability to re-focus light passing through a thin slab composed of this material.

In the mid to late 1990s, John Pendry described some thin wires and split ring resonators (SRR) that paved the way to the fabrication of a meta-material that exhibited the negative index properties at microwave frequencies.

In J. B. Pendry, et. al., Phys. Rev. Lett., 76 4773 (1996), Pendry disclosed that by using an array of thin metal wires, the plasma frequency of a metal could be shifted predictably to microwave frequencies. In J. B. Pendry, et. al., IEEE Trans. Microw. Theory Techniques, 47 2075 (1999), Pendry disclosed that by using an array of non-magnetic coupled metallic split ring resonators (SSR), the permeability of a metamaterial could be made to have negative values. This was demonstrated in the microwave by Smith in D. Smith, et. al., Phys. Rev. Lett., 84 4184 (2000), and more recently in the 100 terahertz range by Linden, in S. Linden, et. al., Science, 306, 1351 (2004). In these structures, the size and spacing of the individual components comprising the metamaterial are assumed much smaller than the wavelength of the resonant frequency of operation. They are also fixed frequency structures.

Smith's NIM structure used split ring resonators and strip lines made of copper over circuit board material. Smith's NIM structure is functional only at a single narrow band frequency, but demonstrated that microwave radiation passing through the wedged shaped NIM was bent through a large negative angle obeying Snell's Law, $n_1 \sin \theta_1 = n_2 \sin \theta_2$. In such negative index materials, since $n_2$ is negative, $\sin \theta_2$ is also negative, yielding a large change in angle.

C. G. Parazzoli, et. al., Phys. Rev. Lett., 90 107401 (2003) A. A. Houck, et. al., Phys. Rev. Lett., 90 137401 (2003), have added additional confirmation to the results of Pendry and Smith, and further demonstrate the properties of a negative index of refraction predicted by Veselago.

Intrinsically photoconductive materials such as gallium arsenide and silicon have been used as high frequency substrates, with roll offs of greater than 50-100 GHz for Si and 1 THz for GaAs, as described in P. Abele, et. al., IEEE MTT-S Digest, 1681 (2002), D. W. Van der Weild, Appl. Phys. Lett. 65, 881 (1994), and U. Bhattacharya, et. al, IEEE Microwave and Guided Wave Letters 5, 50 (1995). Photoconductive bridging of strip line waveguides and resonators on Si have been observed at frequencies as high as 15 GHz with as little as 1 milliwatt per square mm CW illumination at 870 nm, as described in Y. Horri and M. Tsutsumi, Asia Pacific Microwave Conf., 561 (1997). More recently, an IR-defined, photoconductive microwave bowtie antenna in Si exhibited turn-on characteristics at 0.1 watts/cm$^2$ at 970 nm with metallic (copper) like behavior at 1 watt/cm$^2$ CW illumination between 1-18 GHz, as described in D. Liu, et. al., IEEE Photon. Technol. Lett. Vol. 10, page 716 (1998).

Some negative index of refraction composite materials are described in commonly assigned U.S. patent application Ser. No. 11/279,460 to Rachford, the entire disclosure of which is incorporated by reference herein.

BRIEF SUMMARY OF THE INVENTION

One embodiment of the invention is directed to a structure operable to have a below band-gap operational frequency range in which both effective permeability and effective permittivity are negative simultaneously, the index of refraction of the structure being switchable from positive to negative by applying or removing photons at an above band-gap excitation frequency. The structure includes a substrate, at least one resonant element disposed on the substrate arranged to induce a negative permeability at the operational frequency, and at least one strip line element disposed on the substrate for inducing a negative permittivity in the frequency range. At least one of the substrate, the strip line element, and the resonant element includes a photoconductive semiconductor material.

Another embodiment of the invention is directed to a method for switching a metamaterial structure between a positive effective index of refraction value and a negative effective index of refraction. The structure has a substrate, at least one resonant element disposed on the substrate arranged to induce a negative permeability at a below band-gap operational frequency, and at least one strip line element disposed on the substrate arranged to induce a negative permittivity at the operational frequency. At least one of the substrate, the strip line element, and the resonant element comprises a photoconductive semiconductor material. The method comprises the photoconductive semiconductor material receiving above band-gap photons at an excitation frequency.

Another embodiment of the invention is directed to a structure with an index of refraction that is switchable from positive to negative by applying or removing photons at an above band-gap excitation frequency. The structure includes a photoconductive semiconductor wafer, the wafer operable to receive above band-gap photons at an excitation frequency in an excitation pattern on a surface of the wafer, the excitation patterns generating an effective negative index of refraction.

Another embodiment of the invention is directed to a method for switching an effective index of refraction of a structure between a positive value and a negative value, the structure including a photoconductive semiconductor wafer.

The method includes applying above band-gap photons at an excitation frequency in an excitation pattern on a surface of the wafer.

Another embodiment of the invention is directed to a method for tuning a metamaterial structure between a positive effective index of refraction value and a negative effective index of refraction. The structure has a substrate, at least one resonant element disposed on the substrate arranged to induce a negative permeability at a below band-gap operational frequency, and at least one strip line element disposed on the substrate arranged to induce a negative permittivity at the operational frequency. At least one of the substrate, the strip line element, and the resonant element comprises a photoconductive semiconductor material. The method comprises the photoconductive semiconductor material receiving above band-gap photons at an excitation frequency. Changing the amount of above band-gap photons at an excitation frequency results in a change in the index of refraction of the structure.

Another embodiment of the invention is directed to a method for tuning the resonant frequency of a metamaterial structure with a positive effective index of refraction value and a negative effective index of refraction. The structure has a photoconductive semiconductor substrate. An excitation pattern including strip line elements and split ring resonator elements is projected on the substrate. The resonant frequency is tuned by changing the projected pattern in real time.

BRIEF DESCRIPTION OF THE DRAWINGS

FIGS. 3A and 3B illustrate elements of a negative index of refraction material structure in accordance with an embodiment of the invention.

FIGS. 4A and 4B illustrate elements of a negative index of refraction material structure in accordance with an embodiment of the invention.

DETAILED DESCRIPTION OF THE INVENTION

Embodiments of the invention are directed to metamaterial structures having an index of refraction that is switchable and/or tunable from a negative index of refraction to a positive index of refraction by changing the permeability and permittivity of the metamaterial structure in a desired frequency range.

Figure 1:
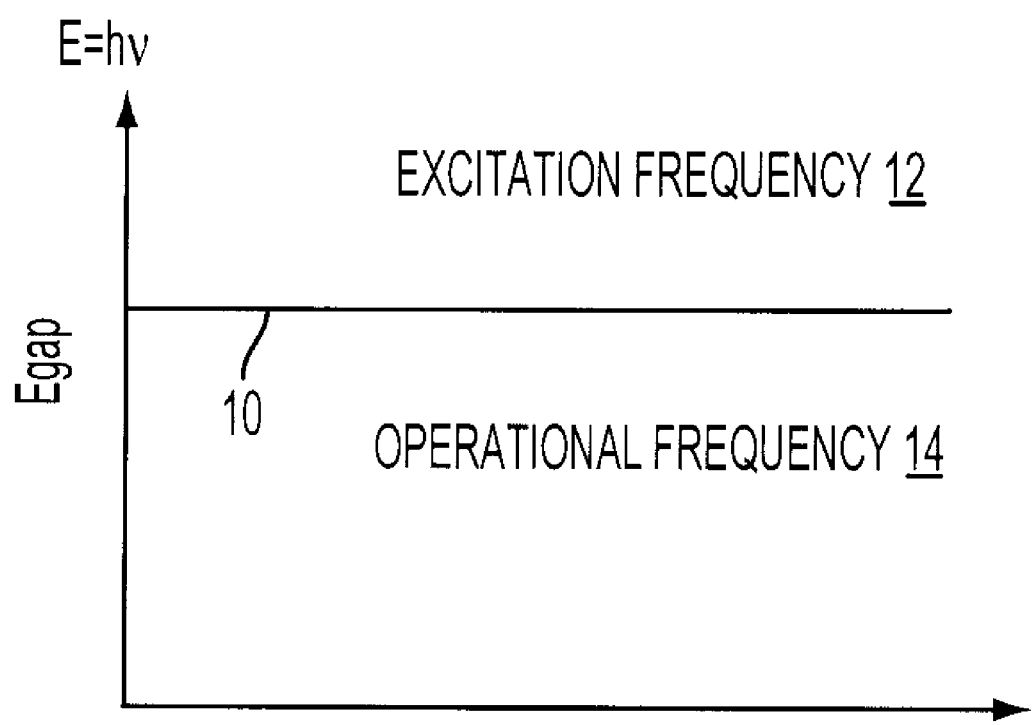
FIG. 1 illustrates excitation frequency and operational frequencies for materials in accordance with embodiments of the invention.

The "excitation frequency" is the above band-gap frequency at which photons are applied to excite a metamaterial structure. The "frequency range of operation" or "operational frequency range" is the frequency range over which elements of the metamaterial can take on a positive or negative value of the index of refraction. FIG. 1 illustrates the band-gap 10 of a semiconductor material, the exciting frequency 12, and the frequency of operation 14. As illustrated in FIG. 1, the exciting frequency 12 is above the band-gap and the operational frequency range 14 is below the exciting frequency and below the band-gap.

In an exemplary embodiment, the frequency range of operation is in a microwave band. More specifically, the frequency range of operation can be about 1 GHz to about 200 GHz, or greater or lesser. The exciting frequency can be in the ultraviolet, visible or near IR frequency bands. Other ranges of operational frequencies, including infrared and visible, are possible, depending on the materials used.

In general, FIG. 2 through 6 illustrate metamaterial structures that include a transparent substrate with photoconductive semiconductor material deposited on the substrate.

FIG. 8-12 illustrate embodiments of the invention in which the substrate is a photoconductive semiconductor material.

Figure 2A:
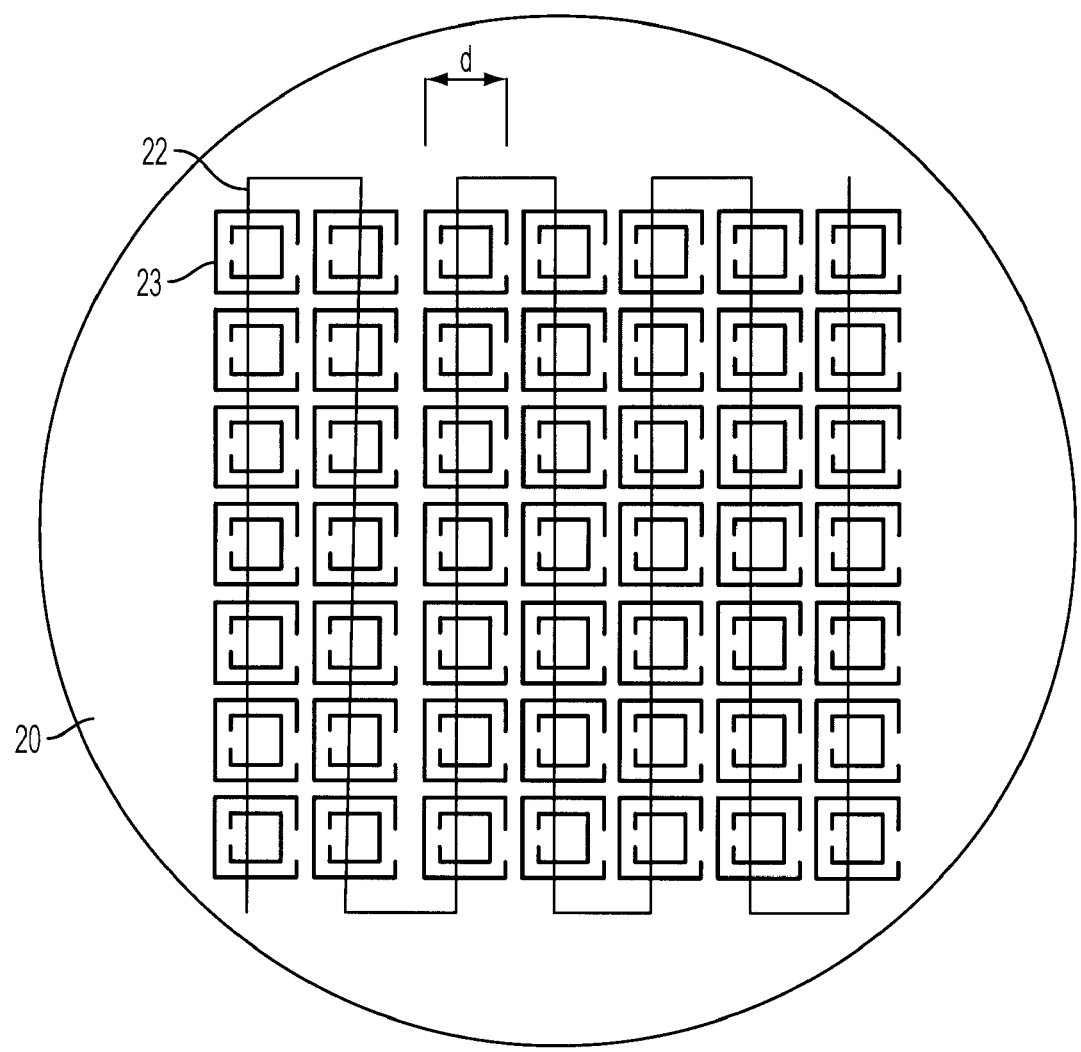
FIGS. 2A, 2B, and 2C illustrate a one dimensional negative index of refraction material structure or one segment of a two dimensional negative index of refraction material structure, in accordance with an embodiment of the invention.
Figure 2B:
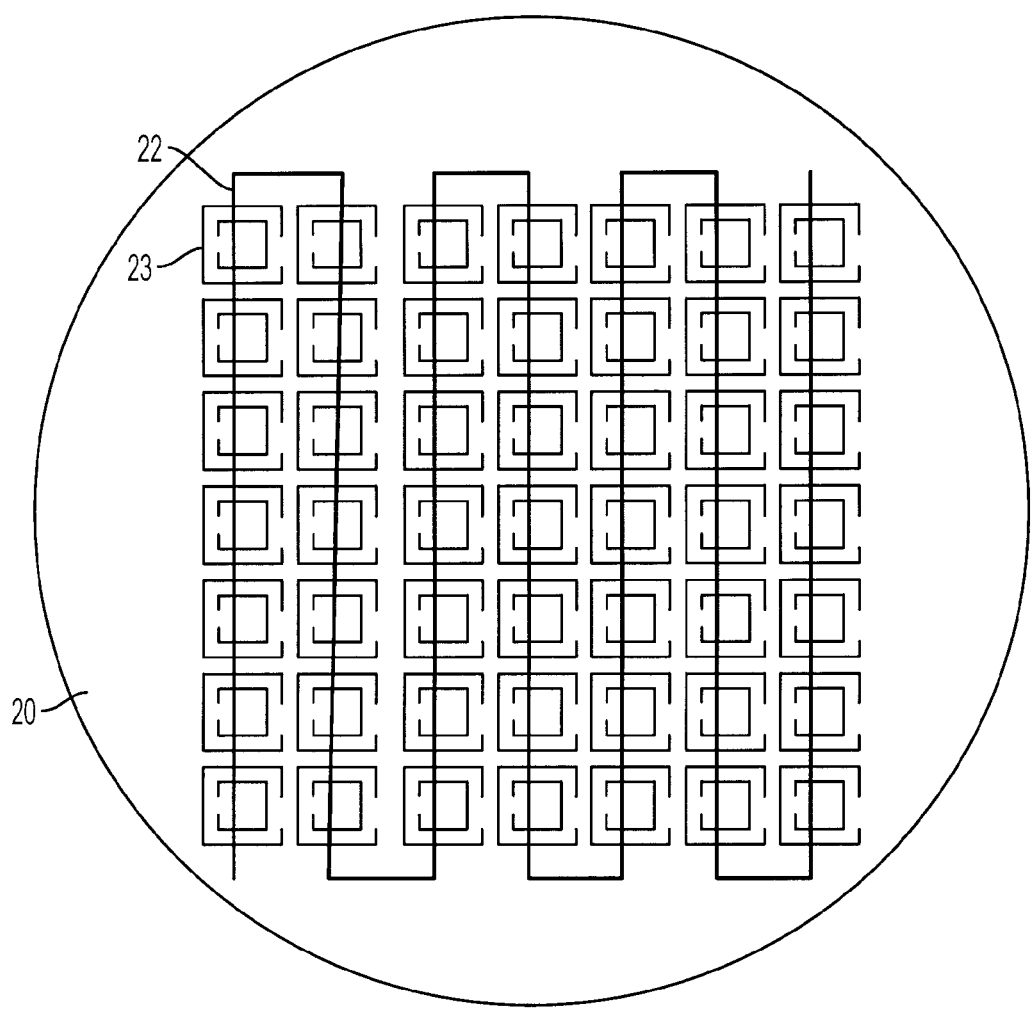
Figure 2C:
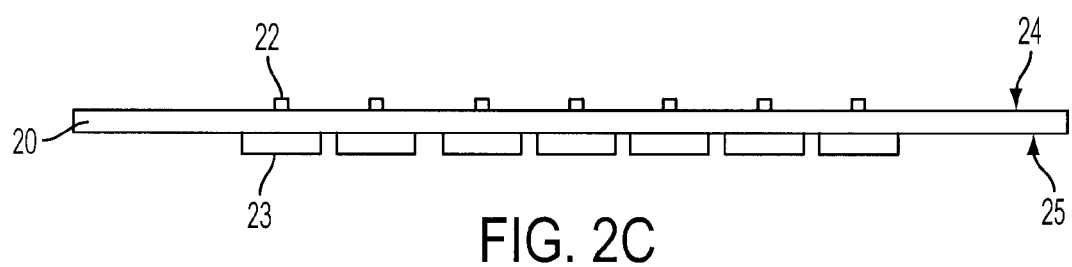

Turning first to FIGS. 2A, 2B, and 2C, a one dimensional metamaterial structure 20 in accordance with one embodiment of the invention or one section of a two dimensional metamaterial structure.

The metamaterial structure 20 includes elements 22 and 23 formed of intrinsic photoconductive semiconductor materials. The elements 22 and 23 are formed on the faces 24 and 25 of substrate 20 that is transparent at the excitation frequency and the operational frequency.

The elements 22 and 23 are formed of an intrinsic photoconductive semiconductor material such as silicon, germanium, gallium arsenide (GaAs), or gallium nitride (GaN). GaAs materials are suitable for terahertz operational frequencies, and silicon is suitable for microwave frequencies of about 150 GHz to 200 GHz. GaN is a suitable photoconductive semiconductor material element for operational frequencies in the infrared or visible bands.

In this embodiment, the substrate 20 is a sapphire wafer four inches in diameter. For microwave operational frequencies, other suitable substrates include polytetrafluoroethylene (PTFE), fused synthetic silica (quartz), and thin polymer, oxide, and other semiconductor materials. Other substrates considered "thin" with respect to the absorption coefficient are also acceptable.

The split ring resonator elements 23 can produce an effective negative permeability μ in a particular frequency region when the elements are excited with the above band-gap photons. The intrinsic photoconductive semiconductor strip line or wire-shaped elements 22 are elongated, linear elements that can produce a negative electric permittivity E over an overlapping frequency region when the elements are excited by above band-gap photons. Simultaneous negative permittivity and permeability produces an effective negative index of refraction for the structure 20.

An optical source provides above band-gap photons at the excitation frequency. The above band-gap photons are absorbed by the intrinsic photoconductive material elements 22 and 23. When the elements 22 and 23 are excited by above band-gap photons, the concentration of carriers in the conduction band increases and the resistivity of the materials decrease. At high enough intensities of above band-gap photons, the intrinsic photoconductive semiconductor materials exhibit metal like behavior in the frequency range of operation. Control of the number of carriers is accomplished by controlling the intensity and wavelength of the photons. When not excited by above band-gap photons, the photoconductive elements 22 and 23 are dielectric, and the metamaterial structure 20 has a positive effective index of refraction.

The resonant elements 23 can be square split ring resonators, as shown in FIG. 2A, or can be other suitable resonant shapes, such as the circular split ring resonators and other shapes discussed in U.S. Pat. No. 6,791,432, the disclosure of which is incorporated herein in its entirety.

The silicon split ring resonator structures 23 have an edge dimension d of approximately 7 mm. The size and spacing of the individual elements is preferably much smaller than the wavelength at the resonant frequency of operation. An upper limit of the edge dimension should be less than ¼ to ⅓ of the operational wavelength. When groups of adjacent split ring resonator elements are activated together (e.g., a three by three array), the edge dimension of the group should be less than ¼ to ⅓ of the operational wavelength.

Preferably, the intrinsic photoconductive semiconductor material has a high electrical resistivity unless excited with above band-gap photons. For example, high purity silicon has a resistivity of above 10,000 Ohm-centimeters, and greater than $10^8$ Ohm-centimeters.

It is also preferred that the substrate have a low index of refraction, so the difference in index of refraction between the substrate and the surrounding medium (e.g. air, other gas) will be low. For example, quartz has a relatively low index of refraction of 1.48, and atmospheric air has an index of refraction of about 1, resulting in a Δn of about 0.48. It is also suitable to use a gas with a higher index of refraction than air, to further reduce the value of Δn to reduce reflections from the excitation photons as they pass through the metamaterial.

In the embodiments above, the photoconductive semiconductor elements are supported by a substrate or wafer. However, in other embodiments, no substrate is used, and the resonant elements and strip line elements have air or another gas between the elements. For example, the resonant elements can be suspended as a series of chain links.

In an embodiment shown in FIGS. 3A and 3B, the rings 31, 33 of the split ring resonator elements are formed of a conductive metal such as copper. The gap between the ends 34, of the outer ring 31 is filled with a photoconductive semiconductor material 32. A conductive metal wire or strip line 37 is arranged on the opposite face of the substrate 30. In operation, when above band-gap photons are not present to excite the photoconductive semiconductor material 32, the structure can take on a negative effective index of refraction for radiation in the operational frequency range. However, when above band-gap photons excite the photoconductive semiconductor material 32, the split ring resonators will not induce the negative permeability, and structure will have a positive effective index of refraction. Alternatively, the inner ring 33 can have photoconductive semiconductor material arranged in the gap between the ends of the inner ring, producing the same effect. It is also suitable to include photoconductive semiconductor material arranged in the gaps between the ends of both rings.

FIGS. 4A and 4B illustrate another embodiment in which the split ring resonators 41 are formed of a conductive metal such as copper, without a photoconductive semiconductor material in the gap between the ends of the rings of the split ring resonators. The strip line elements 42 on the opposite face of the substrate 40 are formed of alternating sections of a conductive metal 44, such as copper, and photoconductive semiconductor material 43. When energy at the exciting frequency is applied, the elements will resonate, producing a negative permittivity and a negative permeability at the required operational frequency. Without application of the above band-gap photons, the strip line element will not induce the negative effective permittivity, and the index of refraction will be positive.

Figure 4C:
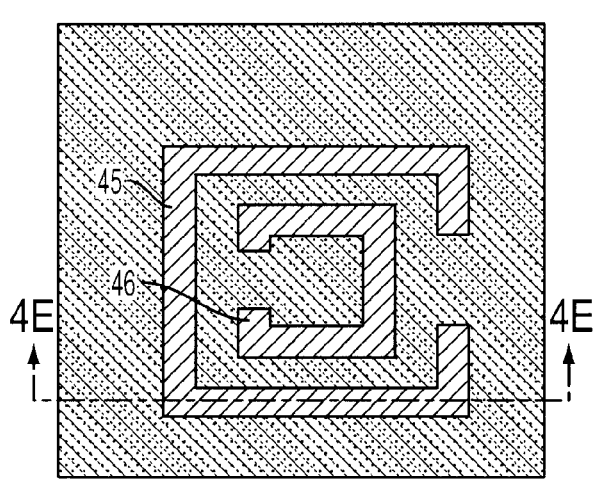
FIGS. 4C, 4D, and 4E illustrate elements of a negative index of refraction material structure in accordance with an embodiment of the invention.
Figure 4D:
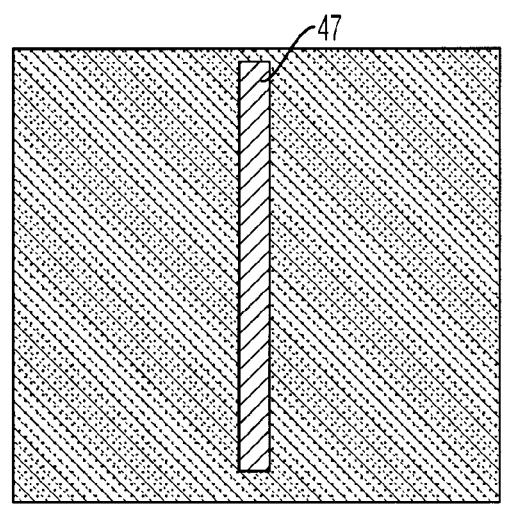
Figure 4E:
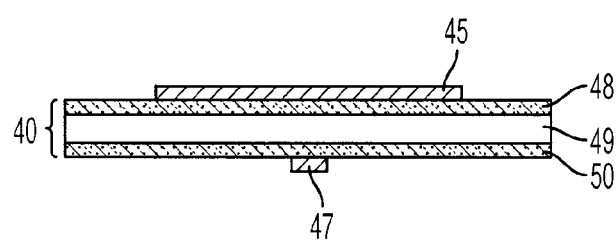

In the embodiment of FIGS. 4C, 4D, and 4E, the split rings 45 and 46 and the strip lines 47 are metallic. The substrate 40 has is a transparent dielectric layer 49 such as sapphire with thin layers or films 48, 50 of a photoconductive semiconductor material. In operation, without above band-gap photons, the metallic elements and substrate have a negative index of refraction. When sufficient above band-gap photons are applied, the photoconductive semiconductor layers short out the split ring resonator and wire elements, and the structure will have a positive index of refraction. In an exemplary embodiment, the substrate is sapphire with a thin layer of silicon on both faces.

Figure 4F:
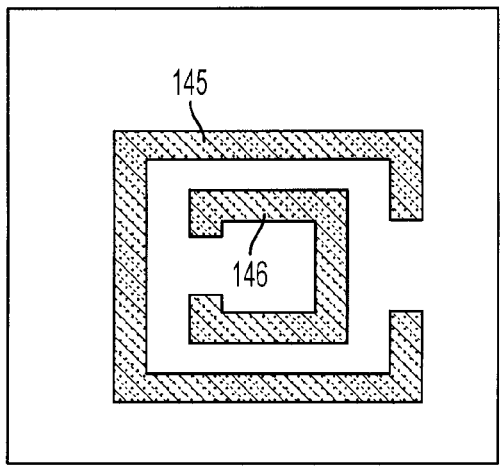
FIGS. 4F and 4G illustrate elements of a negative index of refraction material structure in accordance with an embodiment of the invention.
Figure 4G:
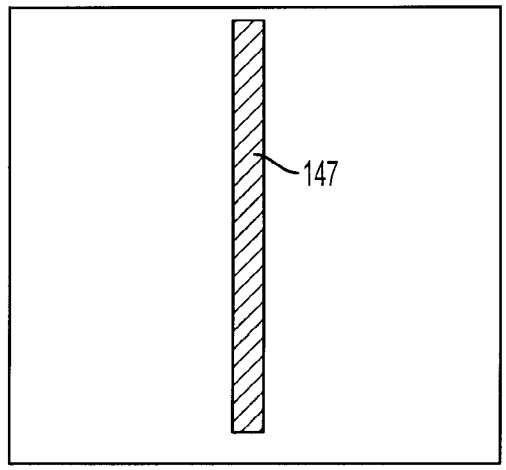

In the embodiment of FIGS. 4F and 4G, the split rings 145 and 146 are photoconductive semiconductor material and the strip lines 147 are metallic. The substrate is a transparent dielectric such as sapphire.

Figure 4H:
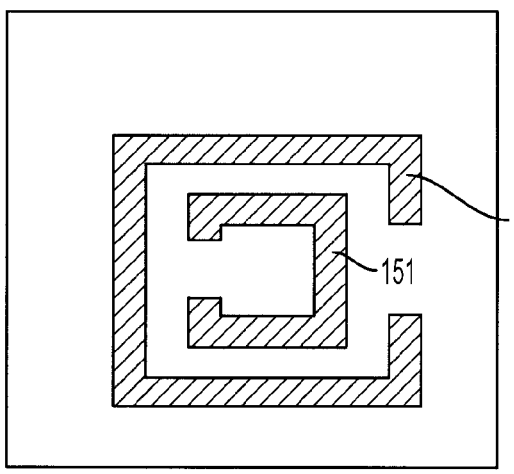
FIGS. 4H and 4I illustrate elements of a negative index of refraction material structure in accordance with an embodiment of the invention.
Figure 4I:
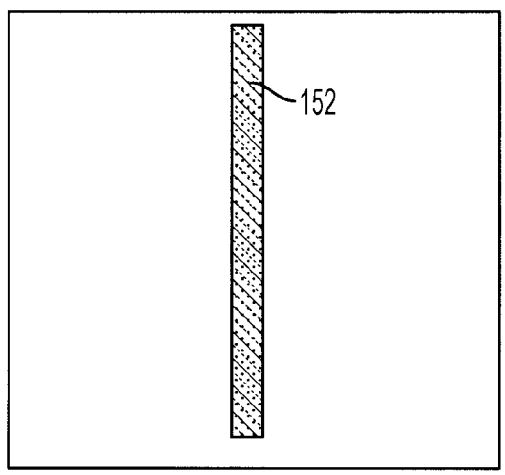

In the embodiment of FIGS. 4H and 4I, the split rings 150 and 151 are metallic and the strip lines 152 are photoconductive semiconductor material. The substrate is a transparent dielectric, such as sapphire.

Figure 5A:
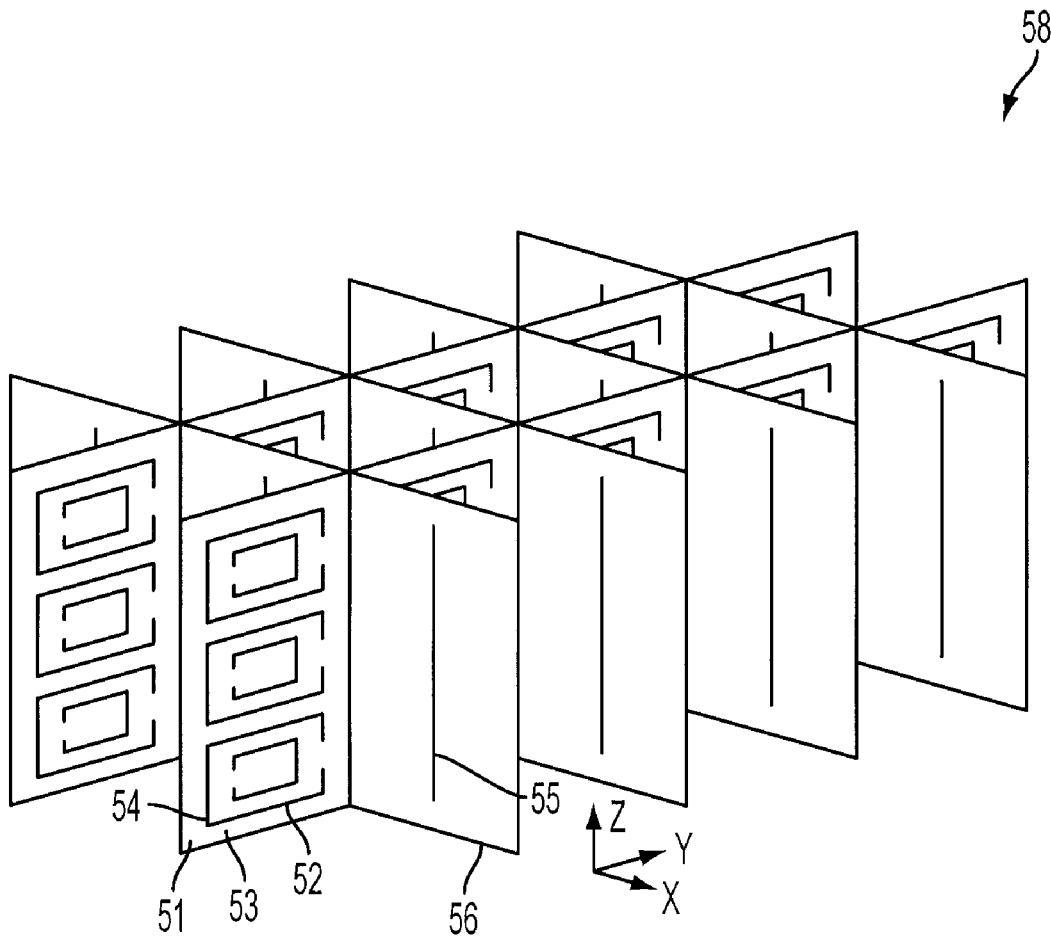
FIGS. 5A and 5B illustrate a two dimensional negative index of refraction material structure in accordance with an embodiment of the invention.
Figure 5B:
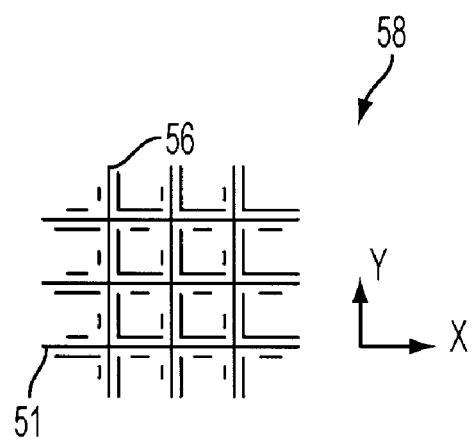

FIGS. 5A and 5B illustrates a two-dimensional metamaterial structure 58 in accordance with another embodiment of the invention. Each wafer 51 has split ring resonator elements 52 on one face 53 and a strip line element 55 arranged behind the split ring resonator on the opposite face 54 of the wafer. Rows of wafers 51 and 56 are arranged perpendicular to each other. Energy in the operational frequency range in the x-y plane will be affected by the negative index of refraction that results from application of above band-gap photons at the excitation frequency.

It is preferred that the structure include at least three elements in each direction x, y, and z. As illustrated in FIG. 5B, three parallel wafers 51 extend in the x direction and three parallel wafers 56 extend in the y direction. The three by three array of wafers should have an outer dimension d smaller than about λ/4 to λ/3, where λ is the wavelength of the operational frequency. Much larger structures with many more rows wafers are also possible.

Figure 6A:
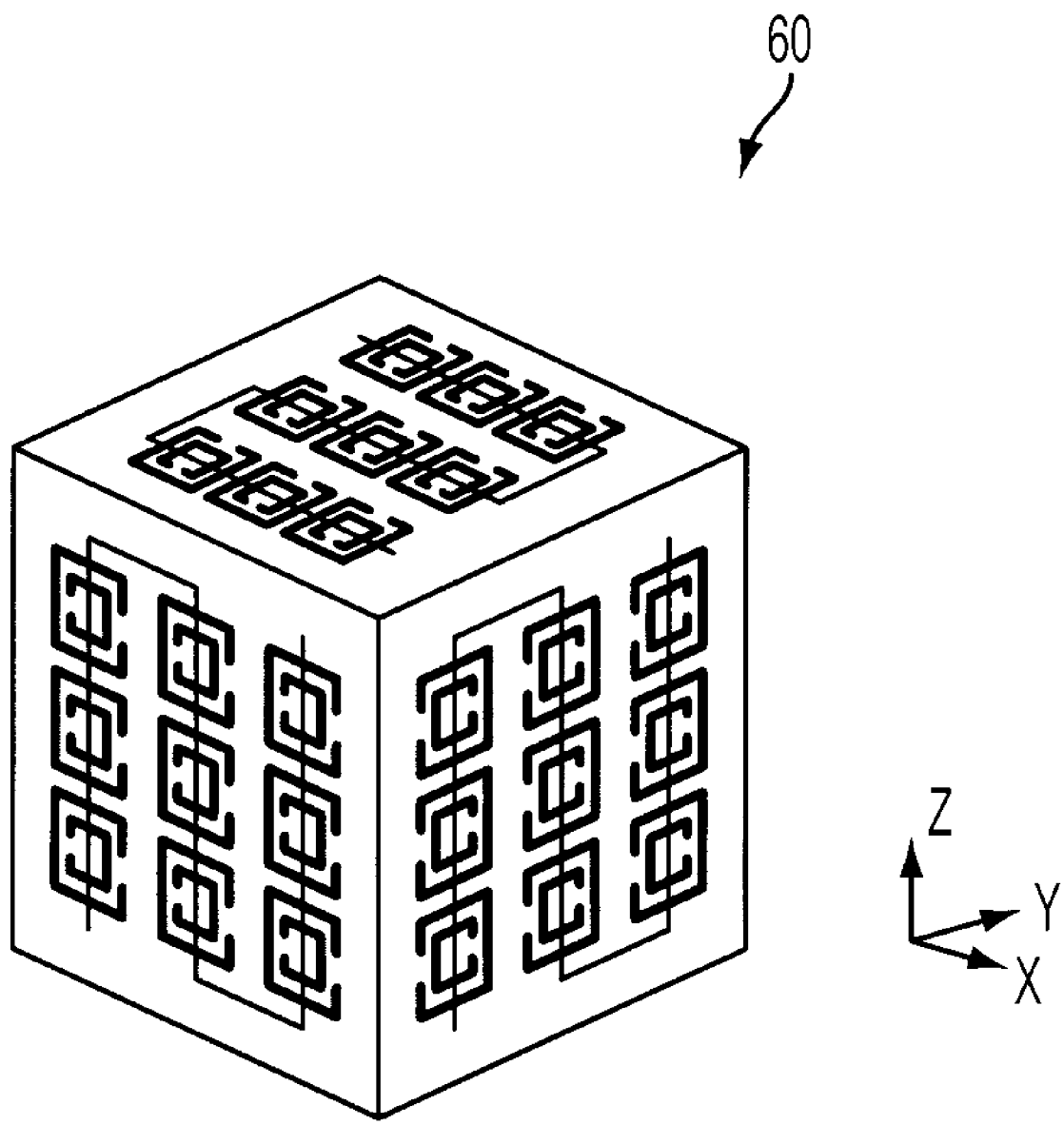
FIGS. 6A and 6B illustrate a three dimensional negative index of refraction material structure in accordance with an embodiment of the invention.
Figure 6B:
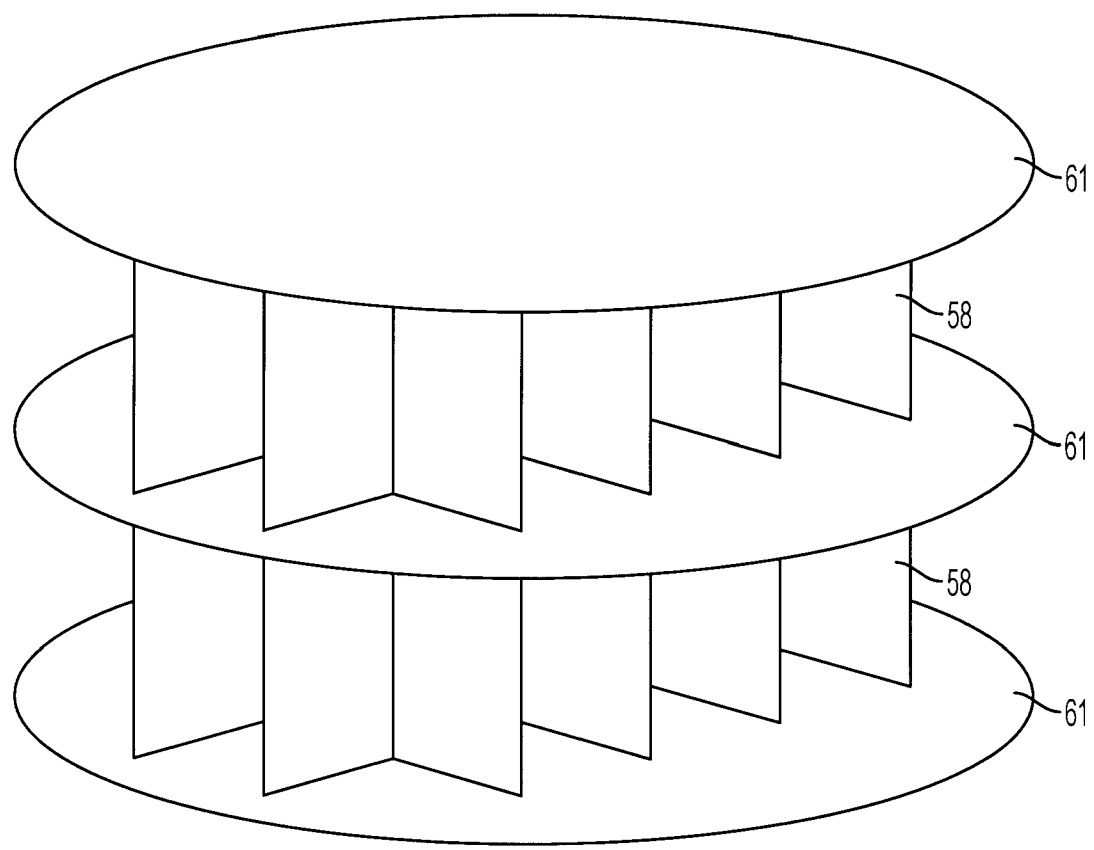

A three dimensional metamaterial structure 60 is illustrated in FIG. 6A. The structure includes substrates arranged perpendicular to each other, each substrate having split ring resonator elements on one face of the substrate and a strip line element on the opposite face of the substrate. As illustrated in FIG. 6B, The structure 60 can be made by sandwiching the two dimensional structure 58 of FIGS. 5A and 5B between parallel substrates 61.

In operation, the three dimensional metamaterial structure 60 is directionally pumped by one or more lasers. The laser or lasers selectively illuminate none, some, or all of the photoconductive elements along three independent axes (x, y, z). By turning on and off the above band-gap source of photons, the metamaterial structure can be made to switch between their positive index values (PIM) and negative index values.

For the one, two, and three dimensional structures discussed herein, the photoconductive elements on either sides of the wafer can be independently switched on and off. By selectively illuminating different numbers of elements, the permittivity and permeability can be "tuned", or independently manipulated, over a broad range of positive and negative values, and hence, the index of refraction can be tuned over a broad range of values. This is a result of averaging over the local PIM and NIM elements whose dimensions are considered small compared to the wavelength of the operational frequency. The maximum positive value of the index of refraction occurs when none of the elements are illuminated, when both the permittivity and permeability are at their maximum positive values. The most negative value of the index of refraction occurs when all of the split ring resonator elements and all of the wire elements are illuminated, so all the split ring resonator elements contribute to the negative permeability and all the wire elements contribute to the negative permittivity.

The ability to turn on and off individual elements or entire regions of a negative index material has a clear advantage. When the negative index elements are small compared to the wavelength of the operational frequency electromagnetic waves passing through the material, the electromagnetic wave does not distinguish, on average, how individual elements of the negative index material are contributing to the electromagnetic response. Similarly, when groups of individual elements of the negative index material structure have a group size considered small compared to the wavelength, the wave does not distinguish, on average, how a group of elements contributes to the electromagnetic response. Instead, by turning on and off individual components or groups of components, the value of the permeability and permittivity of the structure locally will change, thus changing the effective index of refraction at a given frequency when integrated over the negative index material structure as a whole. By controlling how some or all of the elements are switched or tuned, the index of refraction can take on any value between the two index extremes of the most positive index of refraction and the most negative index of refraction. The continuity of the tuning range can be stepwise or continuous, depending on the finite size of the smallest element within the structure. The step size may not be discernable when the element size is much smaller than the resonant wavelength.

Figure 6C:
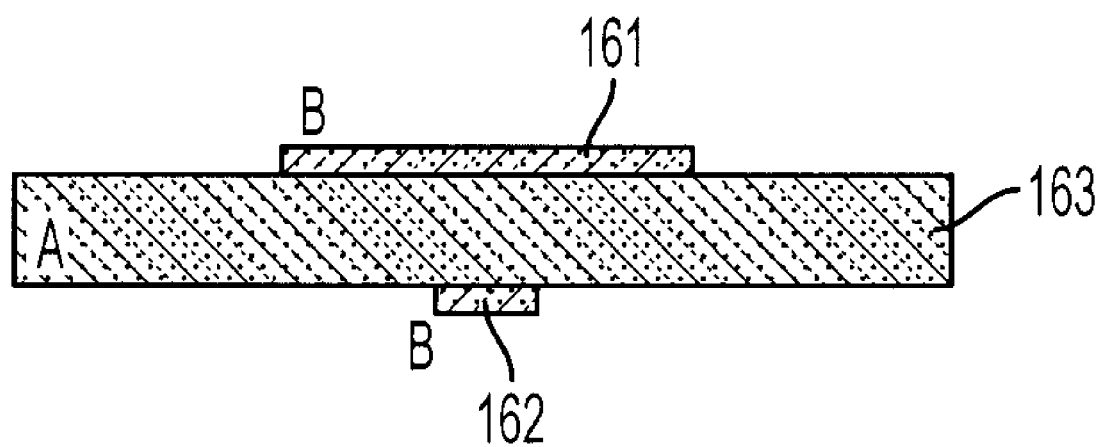
FIG. 6C is a cross sectional view of a semiconductor wafer with two different semiconductor material layers in accordance with an embodiment of the invention.

In another embodiment of the invention, the substrate may be a wide band-gap semiconductor material such that the band-gap of the of the substrate material is larger than the band-gap of the semiconductor elements on the substrate material. For example, FIG. 6C shows a cross sectional view of a split ring resonator 161 and a stripline element 162 disposed on opposite faces of a substrate 163. The substrate 163 and the elements 161 and 162 are semiconductors, however, the semiconductor material of the substrate 163 has a higher bandgap energy than the split ring resonator and strip line elements. The substrate will be transparent to radiation having a frequency above the bandgap of the SRR and strip line elements and below the bandgap of the substrate. The substrate will be conductive when receiving radiation above the bandgap of the substrate. Applying above band-gap energy can thus short out the split ring resonators and strip line elements. Other variations are also possible.

Each of the structures of FIG. 2A-6B can be fabricated with a wide band-gap semiconductor material, allowing the structures to be fabricated entirely of semiconductor materials. A wide band-gap photoconductive semiconductor substrate applied to the above configurations has the advantage of being able to be optically excited with above band-gap wide band-gap photons allowing additional degrees of freedom to the circuit design.

In addition, the semiconductor elements described in FIGS. 2A-6B may be made from different photoconductive semiconductor materials, each with its specific band-gap, providing additional design flexibility.

Figure 7:
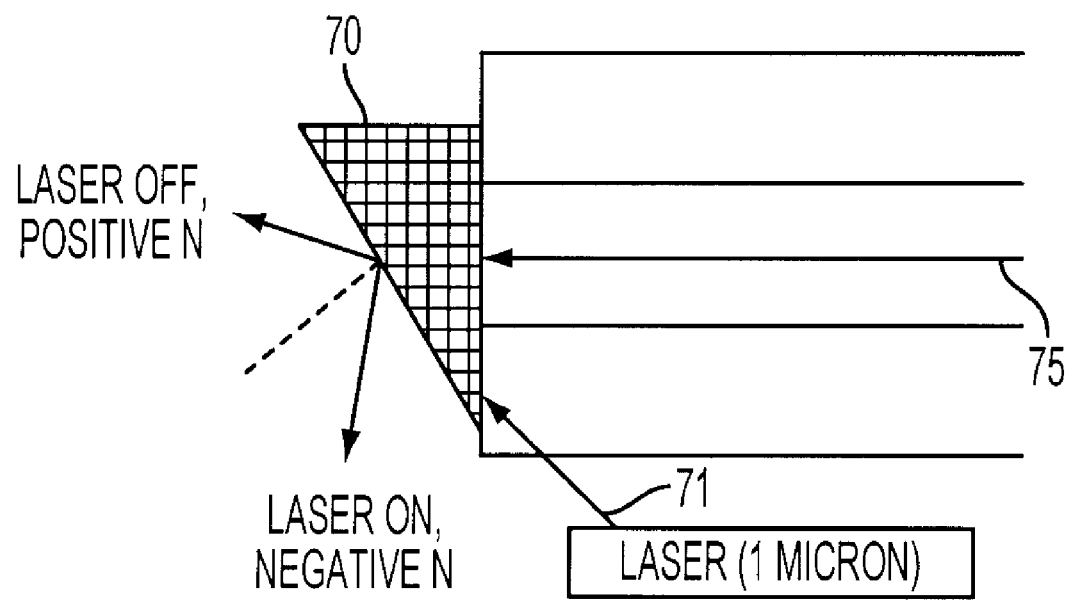
FIG. 7 illustrates tunability of the negative index of refraction for a structure in accordance with an embodiment of the invention.

An embodiment of a metamaterial structure shaped in the form of a prism can illustrate the tuning effect on the index of refraction resulting from exciting different numbers of elements. As shown in FIG. 7, tuning the index of refraction of a prism-shaped metamaterial structure 70 by optically exciting individual elements or groups of elements of the metamaterial structure by varying the distribution of laser energy 71. Electromagnetic energy 75 in the operational frequency is incident on the prism shaped structure 70. When the laser is off, the effective index of refraction is at a maximum positive value. As the number of excited split ring resonators and more strip line elements increases, the index of refraction changes becomes more negative. As the individual elements or groups of elements are excited, the output beam of electromagnetic energy will be swept spatially through a large angle as the index of refraction becomes more negative. Maximum negative index values occur when all elements are excited. Turning the laser on and off switches the effective index of refraction between its most positive value and its most negative value.

In another exemplary embodiment the metamaterial structure is configured as a lens with a tunable focal length. Changing the index of refraction of the structure by optically exciting individual elements or groups of elements will have the effect of changing the focal length of a lens. Since the potential range of index of refraction has both positive and negative values, the same lens formed of the metamaterial structure can be made to perform as a convex or concave lens. Other embodiments include WDM systems, beam compression systems, encryption systems, and frequency lock-in systems using the exemplary photoconductive metamaterials discussed herein.

Figure 8A:
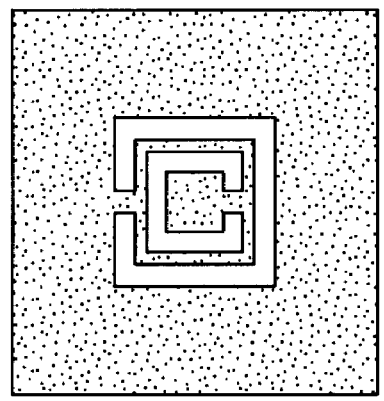
FIG. 8A-8C illustrate an optically defined
Figure 8B:
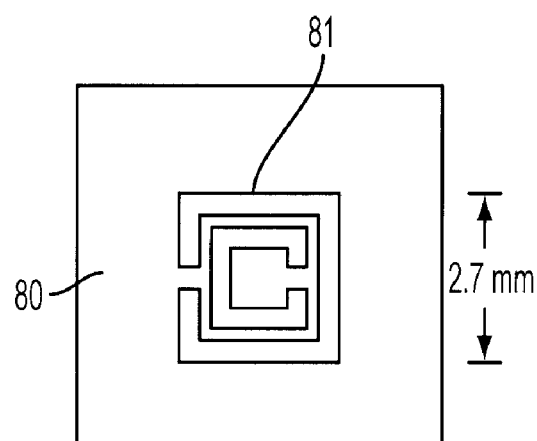
Figure 8C:
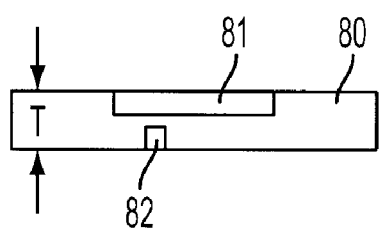

FIGS. 8A, 8B, and 8C illustrate another embodiment of the invention, in which the substrate or wafer 80 itself is formed of a photoconductive semiconductor material. The individual split ring resonator elements 81 and strip line elements 82 are optically defined as an excitation pattern on the wafer 80 that results from projecting light in a pattern on the surface of the photoconductive semiconductor wafer 80. The elements are photoexcited silicon. FIG. 8A is a photograph of an excitation pattern of a Pendry split ring resonator projected onto the surface of intrinsic silicon 80 with a pulsed green laser at a wavelength of 532 nm. The silicon has a resistivity of at least 10,000 Ohm-cm. The excitation patterns forming the elements 81 and 82 are projected onto the substrate 80 from both sides of the substrate. The wafer should be thick enough to generate an element on one face of the substrate without interfering with the element on the opposite side of the substrate. For example the wafer should have an overall thickness of twice $3/\alpha$, where $\alpha$ is the absorption coefficient at the excitation frequency, more than 95% of the intensity of the incident energy at the excitation frequency will be absorbed before reaching the midpoint of the wafer.

Figure 9:
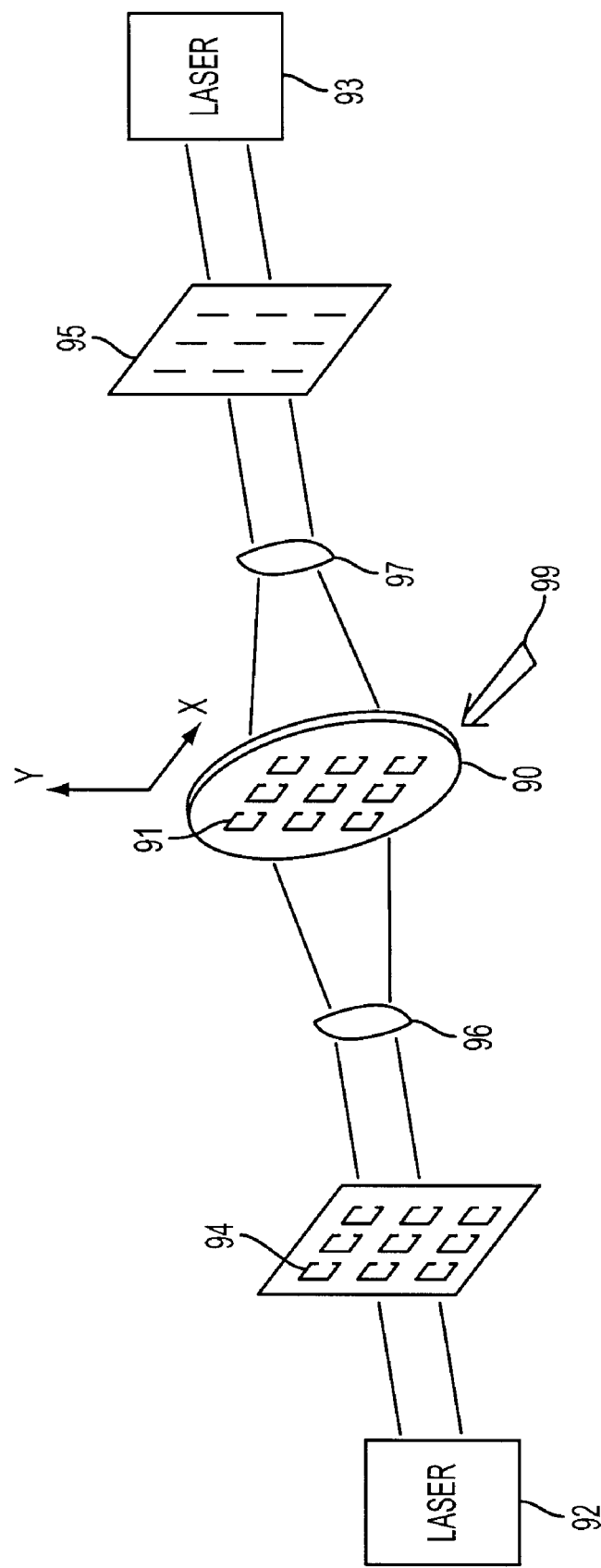
FIG. 9 illustrates different angles of illumination of light sources on an exemplary photoconductive semiconductor wafer in accordance with an embodiment of the invention.

FIG. 9 shows a one dimensional metamaterial structure comprising a photoconductive semiconductor substrate 90. Optical sources 92 and 93 and projection masks 94 and 95 produce excitation patterns 91 on the opposite faces of the photoconductive conductive semiconductor wafer 90.

Lenses 96, 97, or other optical devices can vary the magnification of the excitation patterns (the above band-gap optical images on the photoconductive semiconductor material structure), thus varying the operational frequency of the device. Zoom lenses can change the magnification by more than an order of magnitude. Changing the size of the optical image by an order of magnitude tunes the resonant frequency by a decade or more in microwave frequency ranges.

Tuning of the index of refraction can be accomplished by using different projection masks to produce more or fewer excitation patterns on the wafer 90, or by covering or otherwise blocking some of the projection mask cutouts.

Electromagnetic radiation 99 in the operational frequency band that is traveling in the plane of the wafer will be affected by the resulting negative or positive index of refraction.

As discussed in previous paragraphs addressing FIGS. 8A, 8B, and 8C, the thickness of the wafer should be sufficient to prevent the excitation patterns on opposite faces of the wafer from interfering with each other.

Figure 10:
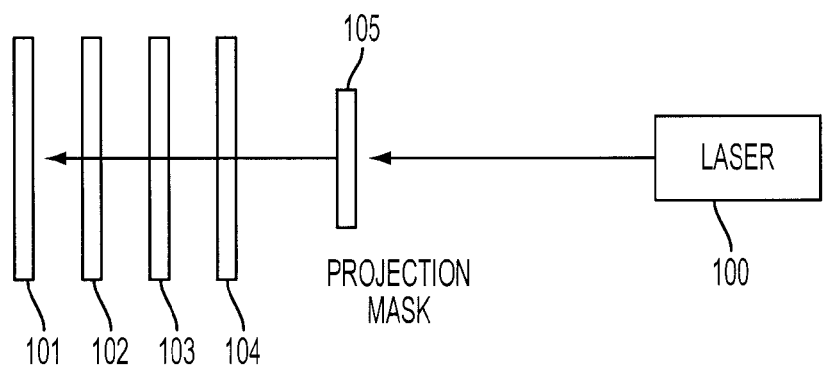
FIG. 10 illustrates an embodiment in which high intensity, slightly above band-gap photons optically excite a series of photoconductive semiconductor wafers.
Figure 11:
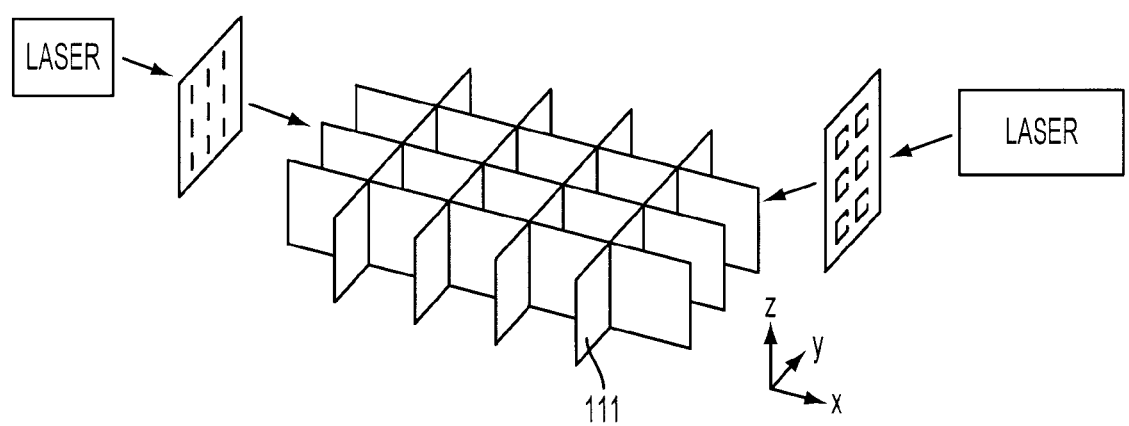
FIG. 11A illustrates optical sources exciting an exemplary two dimensional photoconductive semiconductor wafer structure in accordance with an embodiment of the invention.
FIG. 11B illustrates a cross sectional view of a transparent wafer with photoconductive semiconductor material layers in accordance with an embodiment of the invention.

In another embodiment shown in FIG. 10, a stack of parallel wafers 101, 102, 103 is arranged to receive above band-gap photons in excitation patterns that will produce both an effective negative permittivity and an effective negative permeability. At above band-gap excitation frequencies close to the band edge, the absorption coefficient will be low, and the semiconductor wafer will be relatively transparent at the excitation frequency. If the intensity of the photons is sufficiently high, the excitation patterns will extend through three or more wafers. Split ring resonators and strip line elements can be projected onto the wafers. Alternatively, split ring resonators can be projected onto the wafers and metal strip lines (e.g., copper) can be arranged between the wafers. The dimensions of the copper wires need not change as long as the resonant frequency of the split ring resonators remains below the plasma frequency of the wires.

Two and three dimensional metamaterial structures formed of photoconductive semiconductor wafers can also be illuminated by lasers and projection masks, as illustrated in FIG. 11A. The substrate can also comprise a sapphire or other transparent wafer 116 with a thin layer 115, 116 of photoconductive semiconductor material on one or both faces, as illustrated in FIG. 11B. The thickness of the semiconductor layers would control the maximum thickness of the projected elements. A suitable thickness for a silicon layer on a sapphire substrate is about one to three microns for a microwave operational frequency. This has an advantage of allowing a thinner substrate to be used, and to make the excitation pattern more uniform throughout its depth.

Figure 12A:
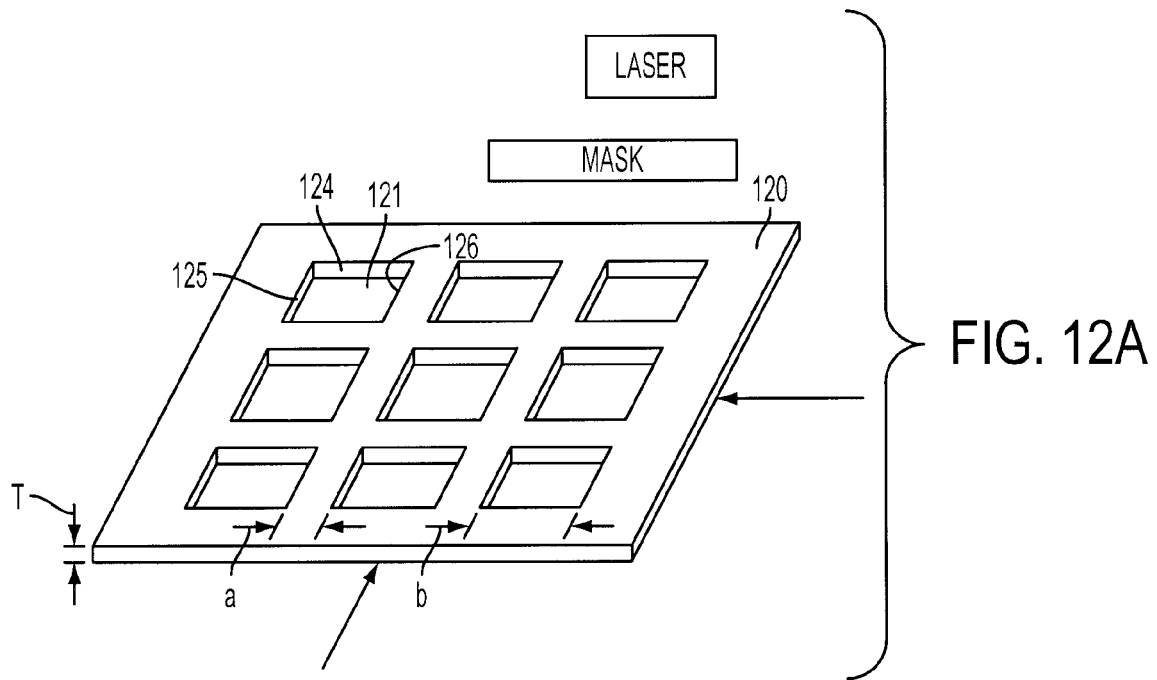
FIGS. 12A and 12B illustrate a two dimensional photoconductive semiconductor wafer structure in accordance with another embodiment of the invention.
Figure 12B:
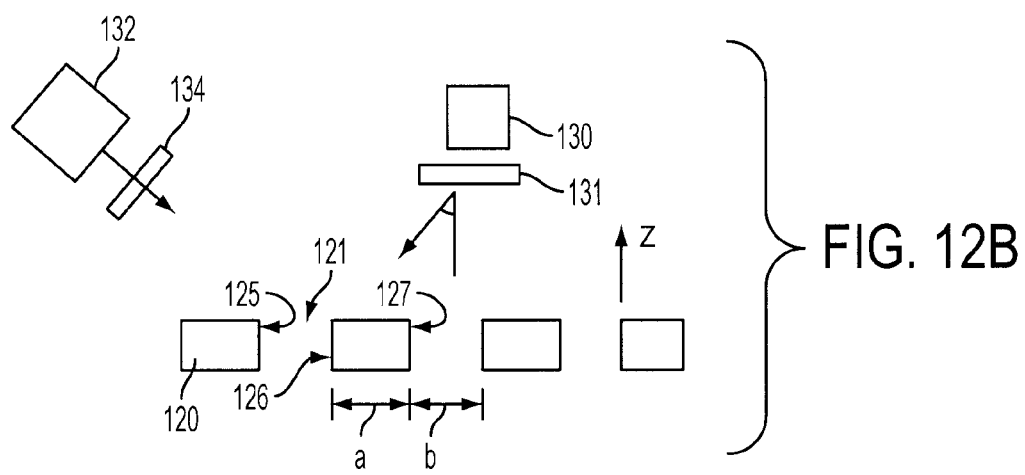

FIGS. 12A and 12B illustrate another two dimensional metamaterial structure comprising a wafer of a photoconductive semiconductor material such as intrinsic silicon. Cut-outs 121, 122 extend through the wafer to provide surfaces 124, 125 on which to project excitation patterns. One or more lasers 130 and projection masks 131 can project excitation patterns on the surfaces 125, 124 formed by the cutouts in the wafer. A projection of split ring resonator elements 1 wide by 3 deep can be projected on walls 124 and 125 while a strip line is projected onto walls 126 and the 4th wall. Dimension "a" would be much smaller than dimension "b" and "T" would equal 3 times "b" in depth. The result would be a 2 dimensional NIM structural equivalent of the SRR and striplines demonstrated by Smith using circuit board and metal structures (D. Smith, et. al., Phys. Rev. Lett., 84 4184 (2000)), but without any metal elements.

A three by three array of split ring resonators can be is projected onto two walls of the wall of the cutout 121, and corresponding strip lines can be are projected onto the other two walls of the cutout. The three by three array dimension should be less than about ¼ to ⅓ of the operational wavelength.

As discussed in previous paragraphs, the operational frequency of the structure can be tuned by varying the size and shape of the excitation patterns on the wafer 120. In addition, the index of refraction can be tuned across a broad range of positive and negative values by projecting none, a few, or all of the possible excitation patterns on the wafer. At some angles, the edges of the wafer can block the exciting photons from reaching the walls of the cutouts. The optical source is therefore preferably arranged at a small angle from the vertical (z) axis. In an exemplary embodiment, the angle between the incident photons and the z axis is less than 11°. The direction of the excitation lasers may be simultaneously from both the top and bottom of the wafer 120, doubling the length of the space available for projection (T). So, if laser light is directed toward opposite faces of the wafer, the wafer can be twice as thick, with twice as many elements projected onto the walls of the wafer cutouts.

The illuminated portions of the photoconductive semiconductor material that form the elements can be split ring resonators, wires, or any other desired element shapes that produce negative effective permittivity and negative effective permeability for the structure.

The distance a between the cut outs and the size b of the cutouts can be selected to reduce or avoid coupling excitation patterns projected onto opposite surfaces of a wall. The density of air or other gas in the system can be selected to minimize the difference in index of refraction between components thereby reducing reflections and losses in the system. Activation of the photoconductive materials can be accomplished using any suitable photon source, including, but not limited to lasers. Individual elements or groups of elements can be selectively illuminated by the use of projection masks, microelectromechanical devices such as mirrored cantilevered microelectromechanical devices, or other suitable devices or optical elements.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A structure operable to have an above band-gap excitation frequency and a below band-gap operational frequency range in which the effective index of refraction of the structure is tunable from positive to negative, the structure comprising:
   a substrate;
   at least one resonant element disposed on the substrate arranged to induce a negative permeability in the operational frequency range; and
   at least one strip line element disposed on the substrate arranged to induce a negative permittivity in the operational frequency range, wherein at least one of the substrate, the strip line element, and the resonant element comprises a photoconductive semiconductor material.

2. The structure according to claim 1, wherein both the strip line element and the resonant element comprise a photoconductive semiconductor material.

3. The structure according to claim 1, wherein the strip line element comprises metal and the resonant element comprises a photoconductive semiconductor material.

4. The structure according to claim 1, wherein the strip line element comprises a photoconductive semiconductor material and the resonant element comprises metal.

5. The structure according to claim 1, wherein the resonant element is a split ring resonator.

6. The structure according to claim 1, wherein the resonant element comprises a split ring resonator with at least one split metal ring and a gap between ends of the split metal ring, and a photoconductive semiconductor material joins the ends of the split metal ring.

7. The structure according to claim 1, wherein the strip line element comprises a plurality of metal segments joined with photoconductive semiconductor material.

8. The structure according to claim 1, wherein the operational frequency is in a microwave range.

9. The structure according to claim 1, wherein the excitation frequency is a visible or near infrared frequency.

10. The structure according to claim 1, wherein the resonant element and the strip line element are disposed on opposite faces of a substrate.

11. The structure according to claim 1, wherein the elements comprise at least one of silicon, gallium arsenide, germanium, and gallium nitride.

12. The structure according to claim 1, wherein the substrate comprises sapphire.

13. The structure according to claim 1, wherein the resonant elements and the strip line elements are metallic, and the substrate comprises a transparent dielectric material and at least one layer of a photoconductive semiconductor material.

14. A structure operable to have an above band-gap excitation frequency and a below band-gap operational frequency range in which the effective index of refraction of the structure is tunable from positive to negative, the structure comprising:
 a substrate, said substrate being transparent at the excitation frequency and in the operational frequency range;
 at least one resonant element disposed on the substrate arranged to induce a negative permeability in the operational frequency range; and
 at least one strip line element disposed on the substrate arranged to induce a negative permittivity in the operational frequency range,
 wherein at least one of the substrate, the strip line element, and the resonant element comprises a photoconductive semiconductor material.

15. A method for tuning a metamaterial structure between a positive effective index of refraction value and a negative effective index of refraction,
 the structure operable to have an above band-gap excitation frequency and a below band-gap operational frequency range in which the effective index of refraction of the structure is tunable from positive to negative, the structure having a substrate, at least one resonant element disposed on the substrate arranged to induce a negative permeability in the below band-gap operational frequency range, and at least one strip line element disposed on the substrate arranged to induce a negative permittivity in the operational frequency range, wherein at least one of the substrate, the strip line element, and the resonant element comprises a photoconductive semiconductor material,
 the method comprising:
 the photoconductive semiconductor material receiving above band-gap photons at the excitation frequency.

16. A method for tuning a metamaterial structure between a positive effective index of refraction value and a negative effective index of refraction,
 the structure operable to have an above band-gap excitation frequency and a below band-gap operational frequency range in which the effective index of refraction of the structure is tunable from positive to negative, the structure having a substrate, a plurality of resonant elements disposed on the substrate arranged to induce a negative permeability in the below band-gap operational frequency range, and a plurality of strip line elements disposed on the substrate arranged to induce a negative permittivity in the operational frequency range, wherein at least one of the substrate, the strip line element, and the resonant element comprises a photoconductive semiconductor material,
 the method comprising:
 the photoconductive semiconductor material receiving a time varying distribution of above band-gap photons at the excitation fre quency.

17. The method according to claim 16, wherein varying the distribution induces conductivity in changing numbers of strip line elements or resonant elements, changing the effective index of refraction for the structure.

18. The method according to claim 16, wherein the distribution of above band-gap photons induces conductivity in at least three adjacent resonant elements or strip line elements.

19. The method according to claim 16, wherein the distribution of above band-gap photons induces conductivity in at least a three by three group of adjacent strip line elements or resonant elements.

20. A method for sweeping a beam of radiation over an angle with a structure, the structure operable to have an above band-gap excitation frequency and a below band-gap operational frequency range in which the effective index of refraction of the structure is tunable from positive to negative, the structure having a substrate, a plurality of split ring resonators arranged to induce a negative permeability in the operational frequency range and a plurality of strip line elements arranged on the substrate to induce a negative permittivity in the operational frequency range, at least one of the substrate, the plurality of split ring resonators and the plurality of strip line elements comprising a photoconductive semiconductor,
 the method comprising:
 the photoconductive semiconductor receiving a time varying distribution of above band-gap photons at the excitation frequency; and
 the structure receiving below band-gap radiation in the operational frequency range, said time varying distribution of above band-gap photons changing the index of refraction of the structure to change the angle of the below band-gap radiation as the below band-gap radiation passes through an exit interface of the structure.

* * * * *